United States Patent
Jedinák et al.

(10) Patent No.: US 10,940,741 B2
(45) Date of Patent: Mar. 9, 2021

(54) VEHICLE DOOR OR TAILGATE WITH SUPPORT STRUCTURE AND METHOD FOR THE PRODUCTION OF SUCH

(71) Applicant: Magna Exteriors (Bohemia) s.r.o., Liberec (CZ)

(72) Inventors: Petr Jedinák, Liberec (CZ); Miroslav Modrák, Liberec (CZ); Josef Půta, Jablonec nad Nisou (CZ)

(73) Assignee: MAGNA EXTERIORS (BOHEMIA) S.R.O., Liberec (CZ)

( * ) Notice: Subject to any disclaimer, the term of this patent is extended or adjusted under 35 U.S.C. 154(b) by 0 days.

(21) Appl. No.: 16/451,157

(22) Filed: Jun. 25, 2019

(65) Prior Publication Data

US 2020/0009947 A1 Jan. 9, 2020

(30) Foreign Application Priority Data

Jul. 4, 2018 (DE) ...................... 10 2018 211 064.6

(51) Int. Cl.
| | |
|---|---|
| *B60J 5/00* | (2006.01) |
| *B60J 5/10* | (2006.01) |
| *B29C 44/12* | (2006.01) |
| *B29C 44/42* | (2006.01) |
| *B60J 5/04* | (2006.01) |
| *B29K 75/00* | (2006.01) |
| *B29K 307/04* | (2006.01) |

(Continued)

(52) U.S. Cl.
CPC ............. *B60J 5/00* (2013.01); *B29C 44/1228* (2013.01); *B29C 44/42* (2013.01); *B60J 5/048* (2013.01); *B60J 5/0463* (2013.01); *B60J 5/107* (2013.01); *B29K 2075/00* (2013.01); *B29K 2307/04* (2013.01); *B29K 2309/08* (2013.01); *B29L 2031/30* (2013.01)

(58) Field of Classification Search
CPC ........ B29C 44/1228; B29C 44/42; B60J 5/00; B60J 5/0463; B60J 5/048; B60J 5/107
See application file for complete search history.

(56) References Cited

U.S. PATENT DOCUMENTS

| | | | |
|---|---|---|---|
| 6,010,182 A | 1/2000 | Townsend | |
| 2005/0140176 A1* | 6/2005 | Hampel | B62D 33/0604 296/190.08 |
| 2012/0211931 A1* | 8/2012 | Fane De Salis | B60G 11/02 267/158 |

FOREIGN PATENT DOCUMENTS

| | | |
|---|---|---|
| DE | 10200516 A1 | 7/2003 |
| DE | 102005011076 A1 | 9/2006 |

(Continued)

OTHER PUBLICATIONS

Search Report dated Mar. 7, 2019 in German Patent Application 10 2018 211 064.6.

(Continued)

*Primary Examiner* — Mathieu D Vargot
(74) *Attorney, Agent, or Firm* — Dickinson Wright PLLC

(57) ABSTRACT

A vehicle door or tailgate, in particular for motor vehicles, with a frame which is formed as a support structure of the door or tailgate and is separate from an exterior and/or interior trim, wherein the frame is produced separately from plastic and/or a composite material, wherein the frame comprises at least two components which are connected to one another, and wherein the at least two components have connection means which comprise tongue and groove connections.

11 Claims, 2 Drawing Sheets

(51) Int. Cl.
   *B29K 309/08*  (2006.01)
   *B29L 31/30*  (2006.01)

(56) References Cited

FOREIGN PATENT DOCUMENTS

| DE | 102014226408 A1 | | 6/2016 |
|----|-----------------|---|--------|
| EP | 112035 A1 | | 8/2001 |
| EP | 1680295 B1 | | 9/2008 |
| JP | 2010500198 A | | 1/2010 |
| KR | 101816434 | * | 1/2018 |
| WO | WO2017/220903 A1 | | 12/2017 |

OTHER PUBLICATIONS

European Search Report dated Dec. 2, 2019 for corresponding EP Application No. 19179994.9.

* cited by examiner

VEHICLE DOOR OR TAILGATE WITH SUPPORT STRUCTURE AND METHOD FOR THE PRODUCTION OF SUCH

CROSS-REFERENCE TO RELATED APPLICATIONS

This application claims the benefit and priority of German Patent Application DE 10 2018 211 064.6, filed Jul. 4, 2018. The entire disclosure of the above application is incorporated herein by reference.

FIELD

The present disclosure relates to a vehicle door or tailgate, in particular for motor vehicles, with a frame which is formed as a support structure of the door or tailgate and is separate from an exterior and/or interior trim, as well as a production method.

BACKGROUND

This section provides background information related to the present disclosure which is not necessarily prior art.

Plastics and/or composite materials, which are essential for lightweight construction, are nowadays also used precisely for reinforcing components in automotive construction.

Larger frames for vehicle tailgates and vehicle doors are thus also produced from these plastics.

Unpublished, commonly owned U.S. application Ser. No. 16/378,958 discloses, by way of example, a method for producing a reinforcing component from various materials, wherein, in a first step, the component is produced in a first mould by reaction injection moulding with foaming of the plastic material used and by reduction of large cross-sections of the component by insertion parts composed of the same plastic material, wherein, in a second step, the component is wound around with at least one fibre type and wherein the component in the third method step is in its entirety overmoulded or consolidated/permeated in a second mould with plastic of a second plastic material.

One problem in the production of this large-format frame is that very large injection moulds are also required for this purpose.

DE 102 00 516 A1 discloses providing identical frames or frames which are the same in terms of key modules for externally different vehicle doors or tailgates and arranging the attachments or mounting parts of the door or tailgate directly on the frame. The frame serves on one hand as a support structure of the door or tailgate and on the other hand as an assembly carrier which can be prefabricated with the associated assemblies and fittings without already finally specifying the form or series of the door or tailgate.

DE 10 2005 0110 76 A1 discloses a vehicle door which can be composed of individual components, wherein the aim is to be able to configure the components differently. The components comprise stamped sheet metal parts in this case. These stamped sheet metal components are overmoulded with plastic in order to generate connection means.

U.S. Pat. No. 6,010,182 discloses a frame for a vehicle which is used at different locations of use on the vehicle. The frame parts are composed of metal or plastic material. The individual frame parts are connected to one another via node components.

EP 1 680 295 B1 shows the frame for a vehicle, wherein frame components are connected to an upper terminating component in which metallic reinforcing corners 52 are used.

The connectors, which can be arranged between two frame parts which adjoin one another approximately in a straight line and/or as connection nodes between more than two frame parts, can furthermore at least partially be formed as fastening flanges for mounting parts, in particular window regulators, window guides or the like.

In terms of low-cost production, it is particularly advantageous to generate the connectors by moulding the profile parts or blanks. A single moulding process is thus sufficient in order on one hand to produce the connectors and on the other hand connect the profile parts or blanks which form the frame to one another.

It is disadvantageous here that the connectors are corner connectors and the frame parts therefore can still be very long.

SUMMARY

This section provides a general summary of the disclosure, and is not a comprehensive disclosure of its full scope or all of its features.

An object of the invention is to provide a vehicle door or tailgate, in particular for motor vehicles, with a frame which is formed as a support structure of the door or tailgate and is separate from an exterior and/or interior trim, wherein the frame is assembled from individual elements.

This object is achieved with a vehicle door or tailgate, in particular for motor vehicles, with a frame which is formed as a support structure of the door or tailgate and is separate from an exterior and/or interior trim, wherein the frame is produced from plastic and/or a composite material, wherein the frame comprises at least two components which are connected to one another, and wherein the at least two components have connection means which comprise tongue and groove connections.

Such a multi-part frame is optimized with the tongue and groove connections so that it satisfies the requirements as a stiffening element.

The division is preferably selected so that the components can be produced such that they are nested in one another. As a result, the size of the injection mould can be reduced.

It is advantageous that the tongue and groove connections can be pushed into one another in a direction perpendicular to the plane of the spanned frame, which simplifies assembly.

The connection means have at least one undercut for an optimal connection which also withstands tensile forces along the longitudinal extensions of the frame parts.

The connection means are equipped with cylindrical or t-shaped or conical lugs and corresponding receptacles.

The object is furthermore achieved with a method for producing a vehicle door or tailgate, wherein a frame is injected at least in two parts in a joint injection mould, the frame parts are removed and the frame parts are brought to the same temperature and the moulded-on tongue and groove connections are brought into engagement.

In an alternative method for producing a vehicle door or tailgate, a frame is injected at least in two parts in a joint injection mould, the frame parts are removed, and the frame parts are brought to different temperatures and the moulded-on tongue and groove connections are brought into engagement, and during cooling the connection means are brought in a strengthened manner into engagement by contraction of one of the components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention is described below by way of example with reference to the enclosed drawings.

Corresponding reference numerals indicate corresponding parts throughout the several views of the drawings.

DETAILED DESCRIPTION

Figure 1:
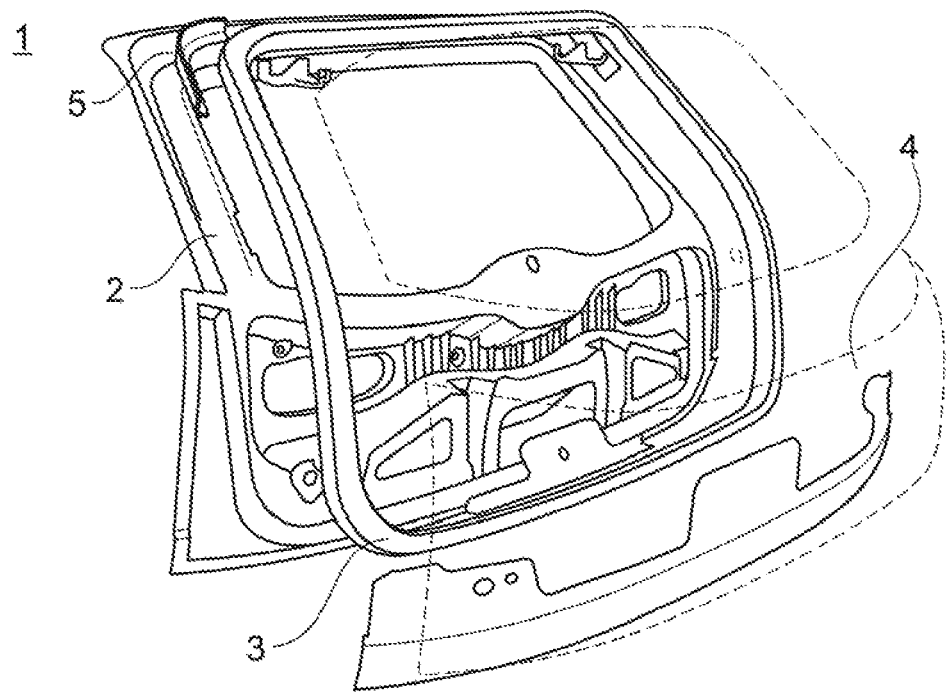
FIG. 1 shows a schematic representation of an exemplary embodiment of a tailgate in the prior art.

Example embodiments will now be described more fully with reference to the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The main constituent parts of a tailgate 1 are represented in FIG. 1. A carrier part 2 which is produced from fibre-reinforced plastics serves as a base of the tailgate. Stiffening frame 3 is a closed form or also a non-closed form as desired composed of a polyurethane material or other composite materials such as epoxy, vinyl ester and other plastic materials. Trim parts 4 are connected to carrier part 2. Stiffening elements 5 which in this exemplary embodiment are produced from metal are provided for stiffening the tailgate. They are connected separately to carrier part 2.

Figure 2:
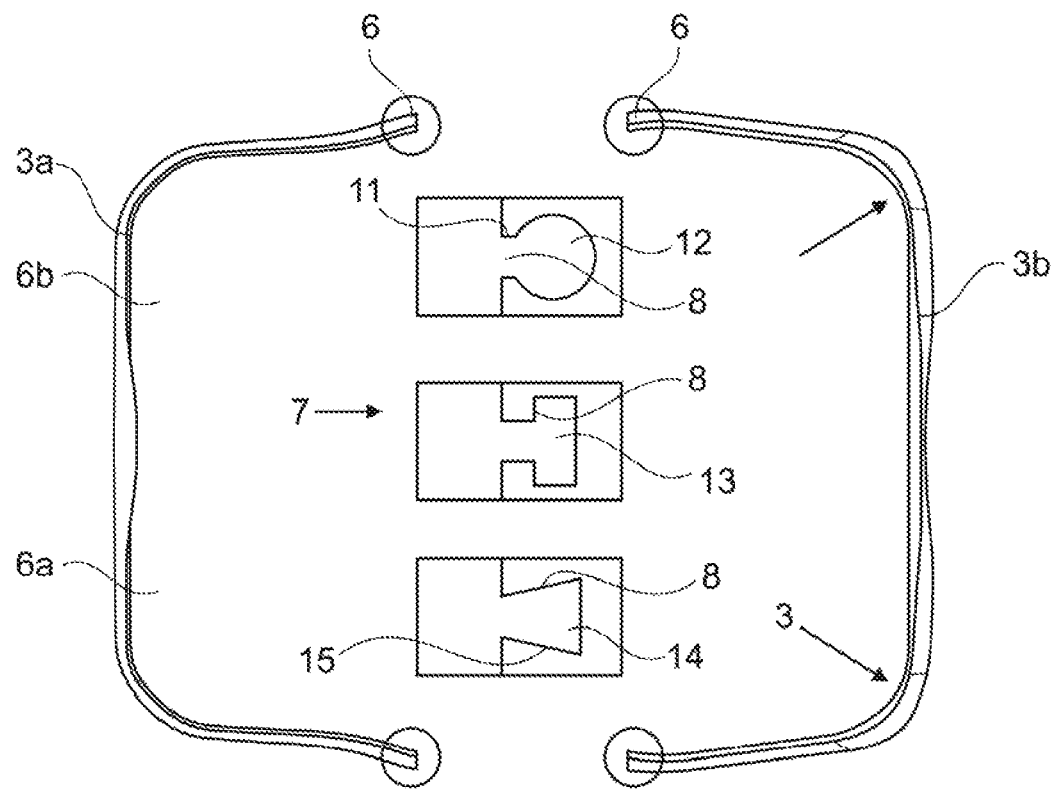
FIG. 2 shows an exemplary frame with connector examples.

In FIG. 2, the frame 3 is produced by way of example from two frame parts 3a and 3b and at contact points 6 in each case connected to one another in order to obtain a closed form. In each case, connection means 7 are fitted at contact points 6. By way of example, three alternative embodiments of a possible connection means 7 are represented in FIG. 2. These alternative embodiments involve tongue and groove connections, represented in the plane spanned by frame parts 3a and 3b. The tongue and groove connections have in this case at least one undercut 8 so that the connection can only be carried out by pressing in a direction, namely in the exemplary embodiment a perpendicular direction to the plane spanned by the frame 3.

Elements which hinder removal from the mould are referred to as an undercut. Because these elements in practice hinder a movement direction during simple removal from the mould, it is necessary to perform release or removal from the mould in a further demoulding direction. These undercuts serve, however, for the configuration of connection means which prevent a simple separation at least in one direction.

Figure 4:
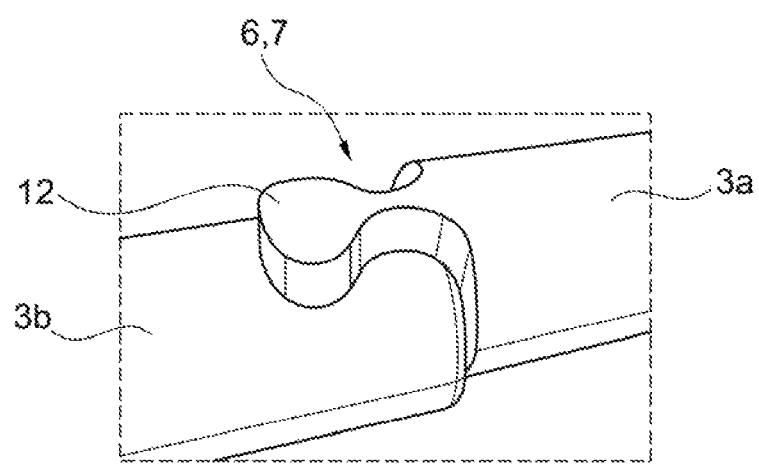
FIG. 4 shows a connection example.

This can be seen in the three-dimensional representation of FIG. 4. The tongue and groove connection is produced by a positive and/or non-positive pressing in of frame part 3a with tongue into frame part 3b with groove.

It is important in this case that connection means 7 fit exactly to one another so that the contact points in no way represent a weakening of the frame structure.

In the uppermost variant of FIG. 2 of connection means 7, a cylindrical lug 12 is formed in left frame part 3a which is connected via a constriction 11 to frame part 3a. As a result, a key hole-like form of the recess is generated on the side of frame part 3a.

In the middle embodiment of FIG. 2, connection means 7 has a T-shaped over-hang, in the case of which blunt end 13 of the T-shaped overhang forms the undercut 8 of connection means 7.

In the lowest embodiment of FIG. 2, frame part 3a of frame 3 forms a conically expanding lug 14, lateral surfaces 15 of which form undercut 8 in this embodiment.

Production of frames 3 only with two elements would still not be a great advantage in terms of space reduction in the plastic injection mould, but is a first optimization step.

Frame 3 as represented in FIG. 2 could, however, be interrupted at further contact points 6a, 6b and pushed into one another via the tongue and groove connections according to the invention. As a result of this, the individual frame elements of frame 3 can be significantly reduced in terms of their size and can be produced nested in one another in a substantially smaller plastic injection mould.

After the injection moulding process, the individual frame parts of frame 3 are removed and assembled to form a closed or open reinforcing frame.

In a first embodiment, connection means 7 should have the same temperature if they are connected to one another. The issue here is to avoid possible problems in the contraction of the plastic during cooling.

The thermal expansion of the plastic could nevertheless also be advantageous in that frame part 3b is configured with the groove so that receiving of the tongue is carried out in the warm state of frame part 3b, while frame part 3a has already cooled and the groove has contracted around the tongue structure if frame part 3b has cooled.

Figure 3:
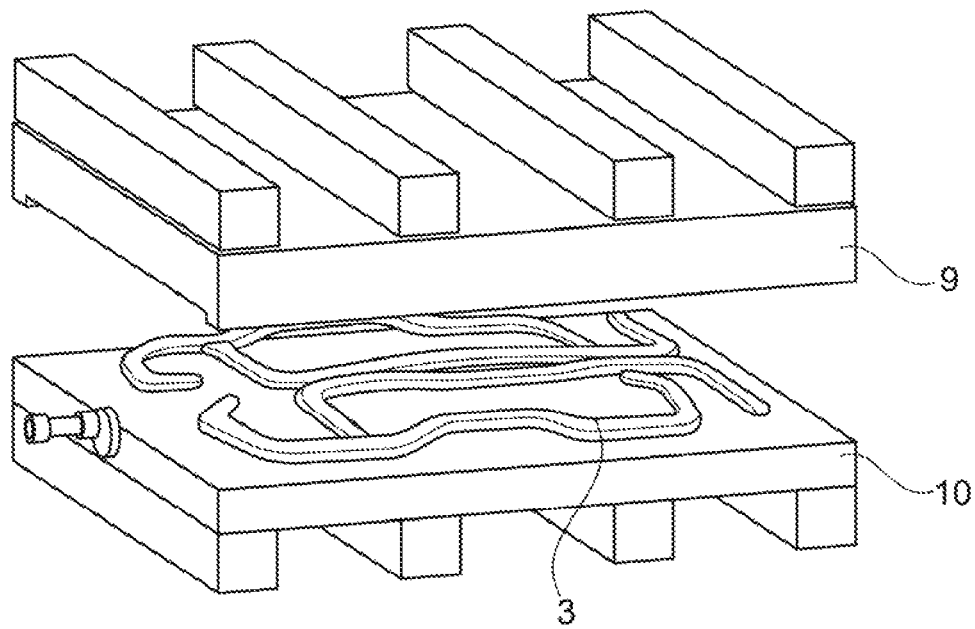
FIG. 3 shows a plastic injection mould.

A plastic injection mould with an upper mould 9 and a lower mould 10 is represented schematically in FIG. 3. This can be a reaction injection mould. The individual components of frame 3 lie nested in one another and are produced jointly via an injection moulding process.

One special embodiment is the production of a frame-like structure, as is described in commonly-owned U.S. application Ser. No. 16/378,958. The production process of frame 3 is carried out in three key method steps. In step S1, a core is produced from polyurethane foam or other plastic materials, with a rigid form being obtained. Frame 3 is in this case injected and foamed as individual components 3a, 3b in a mould 9, 10.

In a further method step, produced frame parts 3a, 3b are connected to one another and subsequently wound around with glass fibres, carbon fibres or other fibres in a continuous process with a winding machine. Frame 3 wound around with the fibres with polyurethane material is subsequently consolidated and/or permeated in a further mould in a last method step with composite material, such as epoxy, vinyl ester or other plastic materials. Here, the same plastic material as in the first method step or also a different plastic material can be used.

In the case of this exemplary embodiments, insertion parts as described in U.S. application Ser. No. 16/378,958 are also expedient in order to not have to foam and, above all, cure large cross-sections entirely in one production step.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE NUMBERS

1 Component
2 Carrier part
3 Frame
3a, 3b Frame parts
4 Trim part
5 Reinforcement part
6 Contact points
6a, 6b Contact points
7 Connection means
8 Undercut
9 Upper mould
10 Lower mould
11 Constriction
12 Cylindrical lug
13 Blunt end
14 Conically expanded lug
15 Lateral surfaces

What is claimed is:

1. A method for producing a vehicle door or tailgate including a frame which is formed as a support structure of the door or tailgate and is separate from a trim, wherein the frame is produced from at least one of a plastic and a composite material, wherein the frame comprises at least two frame parts being substantially the same size and shape as one another which are connected to one another at contact points, and wherein the at least two frame parts have in each case connection means at the contact points, which connection means comprise tongue and groove connections, the method including:
   injecting the at least two frame parts in a joint injection mould with the two frame parts arranged such that they are nested with one another in the joint injection mould;
   removing the at least two frame parts from the injection mould;
   bringing the frame parts to the same temperature; and
   bringing the injected tongue and groove connections into engagement.

2. A method for producing a vehicle door or tailgate, including a carrier part and a frame which is formed as a support structure of the door or tailgate and is separate from the carrier part and a trim, wherein the frame has approximately the same size and shape as an outer perimeter of the carrier part and is produced from at least one of a plastic and a composite material, wherein the frame comprises at least two frame parts being substantially the same size and shape as one another and which are connected to one another at contact points, and wherein the at least two frame parts have in each case connection means at the contact points, which connection means comprise tongue and groove connections, the method including:
- injecting the two frame parts in a joint injection mould with the at least two frame parts nested with one another in the joint injection mould,
- removing the frame parts from the mould;
- bringing the frame parts to different temperatures;
- bringing the injected tongue and groove connections into engagement, and;
- bringing the connection means into engagement by contraction.

3. The method for producing a vehicle door or tailgate according to claim 1, wherein the at least two frame parts are produced in a joint injection mould from foamed material, and wherein the method further comprises:
- removing and assembling the at least two frame parts;
- wrapping the at least two frame parts with fibres in a continuous process with a winding machine; and
- performing at least one of consolidating and permeating the at least two frame parts that are wrapped around with fibres with at least one of the plastic material and the composite material to make the final frame form.

4. A method for producing a vehicle door or tailgate, comprising:
- injecting at least two frame parts of a vehicle door or tailgate in a joint injection mould with the at least two frame parts being substantially the same size and shape as one another and nested with one another in the joint injection mould during moulding, and wherein the at least two frame parts each have at least one tongue and groove connection part for coupling the at least two frame parts to one another; and
- bringing the injected tongue and groove connection parts of the at least two frame parts into engagement with one another to couple the at least two frame parts with one another.

5. The method as set forth in claim 4, further including coupling the at least two frame parts to a carrier part with the at least two frame parts substantially following a perimeter of the carrier part.

6. The method as set forth in claim 4, further including removing the at least two frame parts from the mould, and bringing the at least two frame parts to different temperatures prior to bringing the tongue and groove connection parts of the at least two frame parts into engagement with one another.

7. The method as set forth in claim 4, further including removing the at least two frame parts from the mould, and bringing the at least two frame parts to the same temperature prior to bringing the tongue and groove connection parts of the at least two frame parts into engagement with one another.

8. The method as set forth in claim 4, wherein the at least two frame parts are produced in a joint injection mould from foamed material, and wherein the method further includes wrapping the at least two frame parts with fibres with a winding machine, and performing at least one of consolidating and permeating the at least two frame parts with at least one of a plastic material and a composite material after wrapping the at least two frame parts with fibres.

9. The method as set forth in claim 8 wherein the tongue and groove connection parts include a cylindrical lug on one of the at least two frame parts and another of the at least two frame parts defines a recess receiving the cylindrical lug.

10. The method as set forth in claim 8 wherein the tongue and groove connection parts include a T-shaped overhand on one of the at least two frame parts and another of the at least two frame parts defines a recess receiving the T-shaped overhang.

11. The method as set forth in claim 8 wherein the tongue and groove connection parts include a conically expanding lug on one of the at least two frame parts and another of the at least two frame parts defines a recess receiving the conically expanding lug.

* * * * *